United States Patent
Leight

(10) Patent No.: US 7,025,363 B1
(45) Date of Patent: Apr. 11, 2006

(54) CARGO TRANSPORTATION DOLLY

(76) Inventor: Richard Leight, 4 Meadow Creek Ct., Baltimore, MD (US) 21236

( * ) Notice: Subject to any disclaimer, the term of this patent is extended or adjusted under 35 U.S.C. 154(b) by 0 days.

(21) Appl. No.: 11/124,581

(22) Filed: May 9, 2005

(51) Int. Cl.
 *B62B 1/02* (2006.01)
(52) U.S. Cl. .............................. 280/47.27; 280/47.131; 280/47.17
(58) Field of Classification Search ............. 280/47.27, 280/5.2, 5.24, 47.131, 47.17, 47.19, 5.22
See application file for complete search history.

(56) References Cited

U.S. PATENT DOCUMENTS

| | | | |
|---|---|---|---|
| D157,597 S | 3/1950 | Huber | |
| 2,953,387 A * | 9/1960 | Portner | 280/47.131 |
| 3,045,851 A * | 7/1962 | Rupert | 414/621 |
| 4,248,453 A * | 2/1981 | Stark | 280/655 |
| 4,561,674 A * | 12/1985 | Alessio | 280/655 |
| D310,894 S * | 9/1990 | Smith | D34/23 |
| 5,421,605 A * | 6/1995 | Chen | 280/655 |
| 5,749,588 A | 5/1998 | Stallbaumer | |
| 5,806,868 A | 9/1998 | Collins | |
| 5,810,373 A * | 9/1998 | Miranda | 280/47.2 |
| 5,833,249 A * | 11/1998 | DeMartino | 280/5.2 |
| D412,044 S * | 7/1999 | Deal | D34/12 |
| 6,102,433 A * | 8/2000 | Stevens | 280/646 |
| 6,520,482 B1 * | 2/2003 | Bigham | 254/131 |
| 6,634,658 B1 * | 10/2003 | Larouche | 280/47.2 |
| 2002/0070518 A1 * | 6/2002 | Peters | 280/47.24 |
| 2003/0201615 A1 * | 10/2003 | Grooters et al. | 280/47.27 |
| 2003/0234501 A1 * | 12/2003 | Cohen | 280/47.24 |

* cited by examiner

*Primary Examiner*—J. Allen Shriver

(57) ABSTRACT

A dolly includes a frame having rear and bottom sections directly conjoined to each other. The frame further includes a pair of oppositely disposed leverage arms having opposed end portions directly connected to the rear section and terminating rearward therefrom respectively. The dolly further includes an elongated drive axle directly connected to the leverage arms. First and second pairs of wheels are directly and operably mounted to the end portions of the axles. The dolly further includes a plurality of washers directly engaged with laterally spaced ones of the first and second pairs of wheels Each of the first and second pairs of wheels include a plurality of bearings directly intercalated between the axle end portions and associated rims of the first and second pairs of wheels. A plurality of spacers are nested between the first and second pairs of wheels for preventing undesirable contact therebetween.

17 Claims, 3 Drawing Sheets

CARGO TRANSPORTATION DOLLY

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

TECHNICAL FIELD

This invention relates to hand trucks and, more particularly, to a cargo transportation dolly that provides increased lateral stability when transporting loads.

PRIOR ART

Conventional hand trucks are manually propelled and generally comprise a frame with a handle on the upper end of the frame, wheels at the lower end of the frame, and a toe plate attached at the lower end of the frame, wherein the toe plate is generally perpendicular to the frame. Items carried on the hand truck are stacked on the toe plate, and the frame is rocked backwards, tilting on the wheels so that the items rest against the frame as the hand truck is wheeled to the desired location.

However, the types, shapes and sizes of items which may be transported on a conventional hand truck are limited. Typically, a conventional hand truck works best for moving boxes, bags, and barrels. Items which are not placed directly on the toe plate may not be stable during transporting the hand truck, and those items may fall off through the frame members, to the side, or the front of the hand truck because the only points of support provided by a conventional hand truck are at the toe plate and at the frame supports. Small items and items which are not readily stackable are even more difficult to transport by a conventional hand truck, because of the lack of support points.

Accordingly, a need remains for a hand truck that improves the support and stability of items placed thereon to overcome the above-noted shortcomings. The present invention satisfies such a need by providing a cargo transportation dolly that includes increased lateral support so that large items and large quantities of smaller items can be transported thereon. Such a dolly is less likely to tip than conventional hand trucks, thereby preventing damage to spilled contents, or injuries to bystanders or operators.

BRIEF SUMMARY OF THE INVENTION

In view of the foregoing background, it is therefore an object of the present invention to provide a dolly for supporting and transporting heavy objects between remote locations. These and other objects, features, and advantages of the invention are provided by a dolly including a frame having rear and bottom sections directly conjoined to each other. The rear section has opposed end portions extending upwardly from a ground surface and terminating thereabove at a predetermined height defined along a vertical plane. The bottom section has a substantially planar and smooth top surface protruding forwardly from the rear section and at an angle orthogonal thereto such that the bottom section can receive and support the objects thereon during operating conditions. The frame further includes a pair of oppositely disposed leverage arms having opposed end portions directly connected to the rear section and terminating rearward therefrom respectively.

The dolly further includes an elongated drive axle having a centrally registered longitudinal axis extending orthogonal to a longitudinal length of the rear section and further having opposed end portions terminating laterally and outwardly from the rear section. The axle is directly connected to the leverage arms in such a manner that the axle is maintained at a fixed spatial relationship with the frame during operating conditions.

First and second pairs of wheels are directly and operably mounted to the end portions of the axles in such a manner that the first and second pairs of wheels can be individually removed from the axle without rendering the dolly inoperable. Outer ones of the first and second pairs of wheels include laterally situated valve stems so that an operator can readily inflate the outer wheels without removing the outer wheels from the axle. Inner ones of the first and second pairs of wheels include medially situated valve stems so that an operator can readily inflate the inner wheels without removing the inner wheels from the axle.

The axle further includes a central portion monolithically formed with the end portions of the axle and having a diameter greater than a diameter of the end portions. Such a central portion is axially registered therewith for maintaining a center of mass centrally positioned across a width of the dolly.

The dolly preferably further includes a plurality of washers directly engaged with laterally spaced ones of the first and second pairs of wheels. Such washers are slidably positional along a selected portion of the end portions of the axle such that the lateral ones of the first and second pairs of wheels can be maintained at a laterally fixed relationship about the end portions of the axle respectively.

The dolly preferably further includes a plurality of cotter pins. Each of the end portions of the axle are provided with an aperture disposed laterally from the first and second pairs of wheels. The cotter pins are directly and removably positional through the apertures for inhibiting lateral movement of the first and second pairs of wheels.

Each of the first and second pairs of wheels include a plurality of bearings directly intercalated between the axle end portions and associated rims of the first and second pairs of wheels. The bearings are disposed about the axle end portions and laterally spaced from the axle central portion. A plurality of spacers are nested between the first and second pairs of wheels for preventing undesirable contact therebetween. Each spacer is directly engaged with associated rim sections of the first and second pairs of wheels. In an alternate embodiment, the spacers may include a plurality of monolithically formed pins protruding outwardly therefrom and disposed parallel to the axle such that the pins become interfitted directly with associated rims of the first and second pairs of wheels.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this application will be thorough and complete, and will fully convey the true scope of the invention to those skilled in the art. Like numbers refer to like elements throughout the figures and prime numbers refer to alternate embodiments of such elements.

Figure 1:
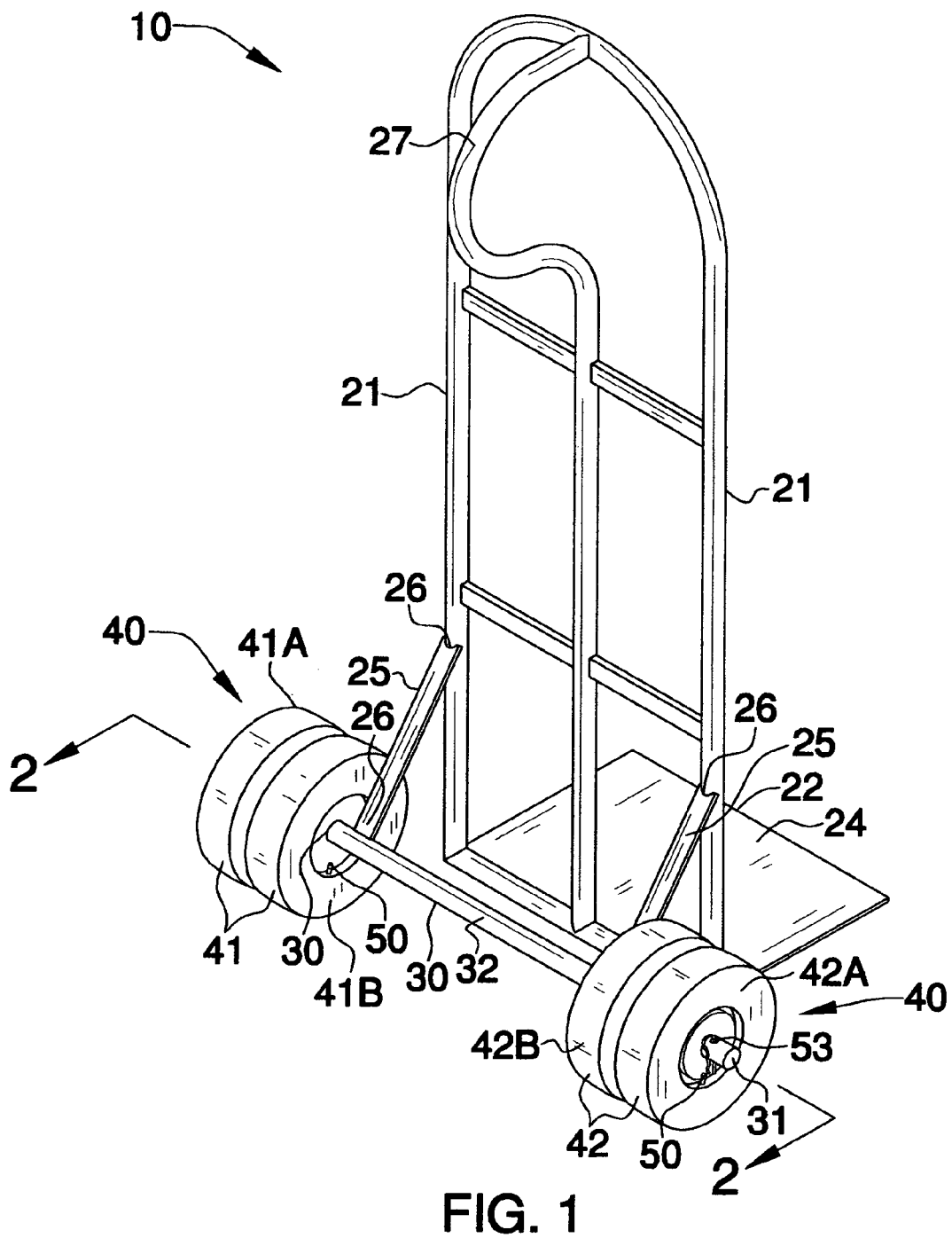
FIG. 1 is a perspective view showing a cargo transportation dolly, in accordance with the present invention.
Figure 2:
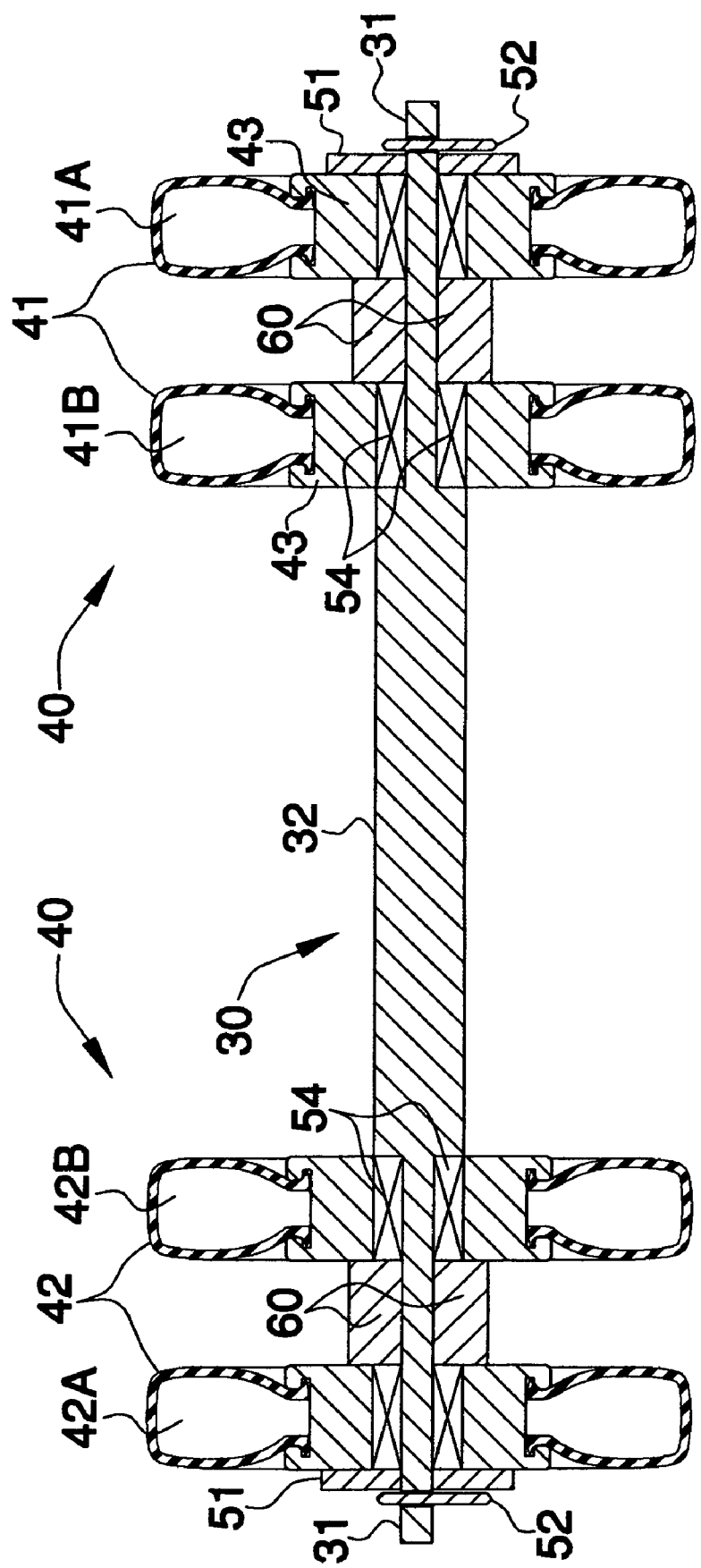
FIG. 2 is a cross-sectional view of dolly shown in FIG. 1, showing the axle and wheels, taken along line 2—2.
Figure 3:
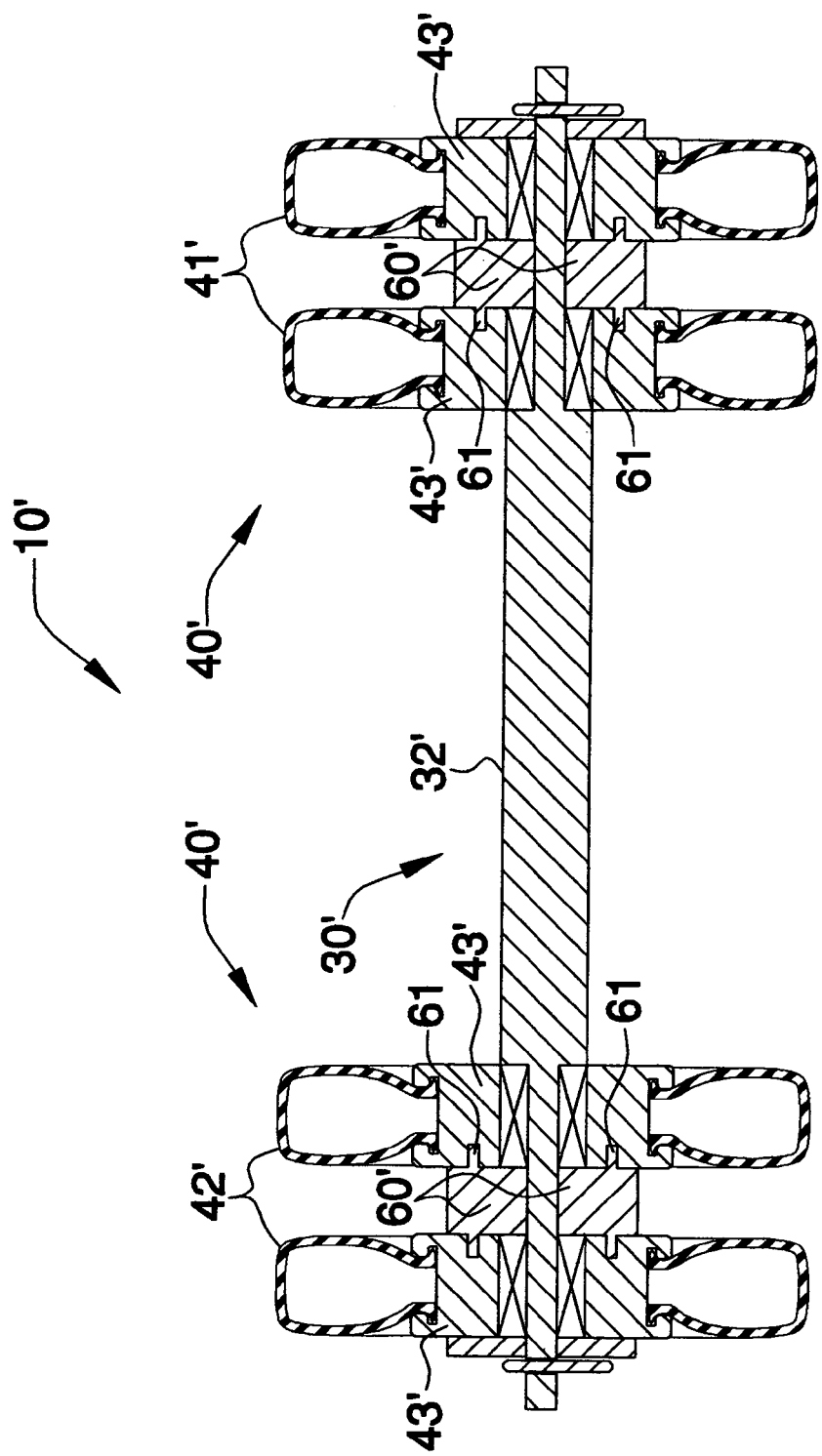
FIG. 3 is a cross-sectional view of an alternate embodiment of the axle and wheels, showing spacers having pins.

The apparatus of this invention is referred to generally in FIGS. 1–3 by the reference numeral 10 and is intended to provide a dolly for supporting and transporting heavy objects between remote locations. It should be understood that the dolly 10 may be used to transport many different types of cargo and should not be limited to only carrying small packages.

Initially referring to FIG. 1, the dolly 10 includes a frame 20 having rear 21 and bottom 22 sections directly conjoined to each other, with no intervening elements. The rear section 21 has opposed end portions 23 extending upwardly from a ground surface and terminating thereabove at a predetermined height defined along a vertical plane. The bottom section 22 has a substantially planar and smooth top surface 24 protruding forwardly from the rear section 21 and at an angle orthogonal thereto such that the bottom section 22 can receive and support the objects thereon during operating conditions.

The frame 20 further includes a pair of oppositely disposed leverage arms 25 having opposed end portions 26 directly connected, with no intervening elements, to the rear section 21 and terminating rearwardly therefrom respectively. The frame 20 may further include an arcuate shaped handle portion 27, as well known in the industry.

Still referring to FIG. 1, the dolly 10 further includes an elongated drive axle 30 having a centrally registered longitudinal axis (not shown) extending orthogonal to a longitudinal length of the rear section 21 and further having opposed end portions 31 terminating laterally and outwardly from the rear section 21. The axle 30 is directly connected, with no intervening elements, to the leverage arms 25 in such a manner that the axle 30 is maintained at a fixed spatial relationship with the frame 20 during operating conditions. Such an axle 30 is preferably longer than a conventional hand truck axle, to accommodate the additional wheels necessary for lateral support. The dolly 10 is preferably formed from steel because of its high strength and durability, but may be formed from aluminum or other metal, as is obvious to one having ordinary skill in the art.

Referring to FIGS. 1 and 2, first 41 and second 42 pairs of wheels 40 are directly and operably mounted to the end portions 31 of the axle 30 in such a manner that the first 41 and second 42 pairs of wheels 40 can be individually removed from the axle 30 without rendering the dolly 10 inoperable. Outer ones 41A, 42A of the first 41 and second 42 pairs of wheels 40 include laterally situated valve stems 50 so that an operator can readily inflate the outer wheels 41A, 42A without removing the outer Wheels 41A, 42A from the axle. Inner ones 41B, 42B of the first 41 and second 42 pairs of wheels 40 include medially situated valve stems 50 so that an operator can readily inflate the inner wheels 41B, 42B without removing the inner wheels 41B, 42B from the axle 30. The positioning of the valve stems 50 is critical for both inner 41B, 42B and outer 41A, 42A wheels so that an operator can easily and readily access the valve stems 50 in such a tandem wheel design. Such a design provides increased lateral support when compared to conventional hand trucks. Delivery personnel, among others, would find such a dolly 10 to be quite helpful because it would be less likely to tip over as many conventional hand trucks do.

Referring to FIG. 2, the axle 30 further includes a central portion 32 monolithically formed with the end portions 31 of the axle 30 and having a diameter greater than a diameter of the end portions 31. Such a central portion 32 is axially registered therewith for maintaining a center of mass centrally positioned across a width of the dolly 10. The dolly 10 further includes a plurality of washers 51 directly engaged with laterally spaced ones of the first 41 and second 42 pairs of wheels 40. Such washers 51 are slidably positional along a selected portion of the end portions 31 of the axle 30 such that the lateral ones of the first 41 and second 42 pairs of wheels 40 can be maintained at a laterally fixed relationship about the end portions 31 of the axle 30 respectively. The washers 51 are essential to maintaining stability during transportation so the wheels 40 do not wobble or oscillate, thereby causing cargo to be displaced therefrom.

Referring to FIGS. 1 and 2, the dolly 10 further includes a plurality of cotter pins 52. Each of the end portions 31 of the axle 30 are provided with an aperture 53 disposed laterally from the first 41 and second 42 pairs of wheels 40. The cotter pins 52 are directly and removably positional through the apertures 53 for inhibiting lateral movement of the first 41 and second 42 pairs of wheels 40. The cotter pins 52 are critical to inhibit such lateral movement during operating conditions, and are also important because they allow a user to easily remove the wheels 40 when they become worn or must be replaced.

Again referring to FIG. 2, each of the first 41 and second 42 pairs of wheels 40 include a plurality of bearings 54 directly intercalated between the axle end portions 31 and associated rims 43 of the first 41 and second 42 pairs of wheels 40. The bearings 54 are disposed about the axle end portions 31 and laterally spaced from the axle central portion 33. A plurality of spacers 60 are nested between the first 41 and second 42 pairs of wheels 40 for preventing undesirable contact therebetween. Each spacer 60 is directly engaged with associated rim sections 43 of the first 41 and second 42 pairs of wheels 40.

Referring to FIG. 3, in an alternate embodiment 10', the spacers 60' include a plurality of monolithically formed pins 61 protruding outwardly therefrom and disposed parallel to the axle 30' such that the pins 61 become interfitted directly with associated rims 43' of the first 41' and second 42' pairs of wheels 40'. Such pins 61 are critical and advantageous over prior art because they help maintain the wheels 40' at stable positions during repeated use over rugged terrain.

The dolly 10 allows a user to carry larger loads, including heavier or more objects than conventional hand trucks. This results in greater efficiency, time and cost savings, and reduces the potential for back and muscle strains normally associated with moving heavy objects and caused by overloading an outmatched hand truck. Energetic and eager workers, particularly younger ones, often desire to impress their employers by moving loads that are bigger and heavier than their co-workers. Unfortunately, such actions frequently result in overturned goods, causing damage and thereby negating the goodwill that might otherwise have been fostered by reducing the number of trips to transport the objects.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A dolly for supporting and transporting heavy objects between remote locations, said dolly comprising:

a frame having rear and bottom sections directly conjoined to each other, said rear section having opposed end portions extending upwardly from a ground surface and terminating thereabove at a predetermined height defined along a vertical plane, said bottom section having a substantially planar and smooth top surface protruding forwardly from said rear section and at an angle orthogonal thereto such that said bottom section can receive and support the objects thereon during operating conditions, said frame further including a pair of oppositely disposed leverage arms having opposed end portions directly connected to said rear section and terminating rearward therefrom respectively;

an elongated drive axle having a centrally registered longitudinal axis extending orthogonal to a longitudinal length of said rear section and further having opposed end portions terminating laterally and outwardly from said rear section, said axle being directly connected to said leverage arms in such a manner that said axle is maintained at a fixed spatial relationship with said frame during operating conditions; and first and second pairs of wheels directly and operably mounted to said end portions of said axles in such a manner that said first and second pairs of wheels can be individually removed from said axle without rendering said dolly inoperable;

wherein each said first and second pairs of wheels comprises: a plurality of bearings directly intercalated between said axle end portions and associated rims of said first and second pairs of wheels, said bearings being disposed about said axle end portions and laterally spaced from said axle central portion.

2. The dolly of claim 1, wherein said axle further includes a central portion monolithically formed with said end portions of said axle, said central portion having a diameter greater than a diameter of said end portions and being axially registered therewith for maintaining a center of mass centrally positioned across a width of said dolly.

3. The dolly of claim 1, further comprising: a plurality of washers directly engaged with laterally spaced ones of said first and second pairs of wheels, said washers being slidably positional along a selected portion of said end portions of said axle such that said lateral ones of said first and second pairs of wheels can be maintained at a laterally fixed relationship about said end portions of said axle respectively.

4. The dolly of claim 1, further comprising: a plurality of cotter pins, each said end portions of said axle being provided with an aperture disposed laterally from said first and second pairs of wheels, said cotter pins being directly and removably positional through the apertures for inhibiting lateral movement of said first and second pairs of wheels.

5. The dolly of claim 4, further comprising: a plurality of spacers nested between said first and second pairs of wheels for preventing undesirable contact therebetween, each said spacers being directly engaged with associated rim sections of said first and second pairs of wheels.

6. The dolly of claim 5, wherein said spacers comprise: a plurality of monolithically formed pins protruding outwardly therefrom and disposed parallel to said axle such that said pins become interfitted directly with associated rims of said first and second pairs of wheels.

7. A dolly for supporting and transporting heavy objects between remote locations, said dolly comprising:

a frame having rear and bottom sections directly conjoined to each other, said rear section having opposed end portions extending upwardly from a ground surface and terminating thereabove at a predetermined height defined along a vertical plane, said bottom section having a substantially planar and smooth top surface protruding forwardly from said rear section and at an angle orthogonal thereto such that said bottom section can receive and support the objects thereon during operating conditions, said frame further including a pair of oppositely disposed leverage arms having opposed end portions directly connected to said rear section and terminating rearward therefrom respectively;

an elongated drive axle having a centrally registered longitudinal axis extending orthogonal to a longitudinal length of said rear section and further having opposed end portions terminating laterally and outwardly from said rear section, said axle being directly connected to said leverage arms in such a manner that said axle is maintained at a fixed spatial relationship with said frame during operating conditions; and first and second pairs of wheels directly and operably mounted to said end portions of said axles in such a manner that said first and second pairs of wheels can be individually removed from said axle without rendering said dolly inoperable, outer ones of said first and second pairs of wheels including laterally situated valve stems so that an operator can readily inflate said outer wheels without removing said outer wheels from said axle;

wherein each said first and second pairs of wheels comprises: a plurality of bearings directly intercalated between said axle end portions and associated rims of said first and second pairs of wheels, said bearings being disposed about said axle end portions and laterally spaced from said axle central portion.

8. The dolly of claim 7, wherein said axle further includes a central portion monolithically formed with said end portions of said axle, said central portion having a diameter greater than a diameter of said end portions and being axially registered therewith for maintaining a center of mass centrally positioned across a width of said dolly.

9. The dolly of claim 7, further comprising: a plurality of washers directly engaged with laterally spaced ones of said first and second pairs of wheels, said washers being slidably positional along a selected portion of said end portions of said axle such that said lateral ones of said first and second pairs of wheels can be maintained at a laterally fixed relationship about said end portions of said axle respectively.

10. The dolly of claim 7, further comprising: a plurality of cotter pins, each said end portions of said axle being provided with an aperture disposed laterally from said first and second pairs of wheels, said cotter pins being directly and removably positional through the apertures for inhibiting lateral movement of said first and second pairs of wheels.

11. The dolly of claim 10, further comprising: a plurality of spacers nested between said first and second pairs of wheels for preventing undesirable contact therebetween, each said spacers being directly engaged with associated rim sections of said first and second pairs of wheels.

12. The dolly of claim 11, wherein said spacers comprise: a plurality of monolithically formed pins protruding outwardly therefrom and disposed parallel to said axle such that said pins become interfitted directly with associated rims of said first and second pairs of wheels.

13. A dolly for supporting and transporting heavy objects between remote locations, said dolly comprising:

a frame having rear and bottom sections directly conjoined to each other, said rear section having opposed end portions extending upwardly from a ground surface and terminating thereabove at a predetermined height defined along a vertical plane, said bottom section having a substantially planar and smooth top surface protruding forwardly from said rear section and at an angle orthogonal thereto such that said bottom section can receive and support the objects thereon during operating conditions, said frame further including a pair of oppositely disposed leverage arms having opposed end portions directly connected to said rear section and terminating rearward therefrom respectively;

an elongated drive axle having a centrally registered longitudinal axis extending orthogonal to a longitudinal length of said rear section and further having opposed end portions terminating laterally and outwardly from said rear section, said axle being directly connected to said leverage arms in such a manner that said axle is maintained at a fixed spatial relationship with said frame during operating conditions; and first and second pairs of wheels directly and operably mounted to said end portions of said axles in such a manner that said first and second pairs of wheels can be individually removed from said axle without rendering said dolly inoperable, outer ones of said first and second pairs of wheels including laterally situated valve stems so that an operator can readily inflate said outer wheels without removing said outer wheels from said axle, inner ones of said first and second pairs of wheels including medially situated valve stems so that an operator can readily inflate said inner wheels without removing said inner wheels from said axle;

wherein each said first and second pairs of wheels comprises: a plurality of bearings directly intercalated between said axle end portions and associated rims of said first and second pairs of wheels, said bearings being disposed about said axle end portions and laterally spaced from said axle central portion.

14. The dolly of claim 13, wherein said axle further includes a central portion monolithically formed with said end portions of said axle, said central portion having a diameter greater than a diameter of said end portions and being axially registered therewith for maintaining a center of mass centrally positioned across a width of said dolly.

15. The dolly of claim 13, further comprising: a plurality of washers directly engaged with laterally spaced ones of said first and second pairs of wheels, said washers being slidably positional along a selected portion of said end portions of said axle such that said lateral ones of said first and second pairs of wheels can be maintained at a laterally fixed relationship about said end portions of said axle respectively.

16. The dolly of claim 13, further comprising: a plurality of cotter pins, each said end portions of said axle being provided with an aperture disposed laterally from said first and second pairs of wheels, said cotter pins being directly and removably positional through the apertures for inhibiting lateral movement of said first and second pairs of wheels.

17. The dolly of claim 16, further comprising: a plurality of spacers nested between said first and second pairs of wheels for preventing undesirable contact therebetween, each said spacers being directly engaged with associated rim sections of said first and second pairs of wheels.

* * * * *